Figure 17:
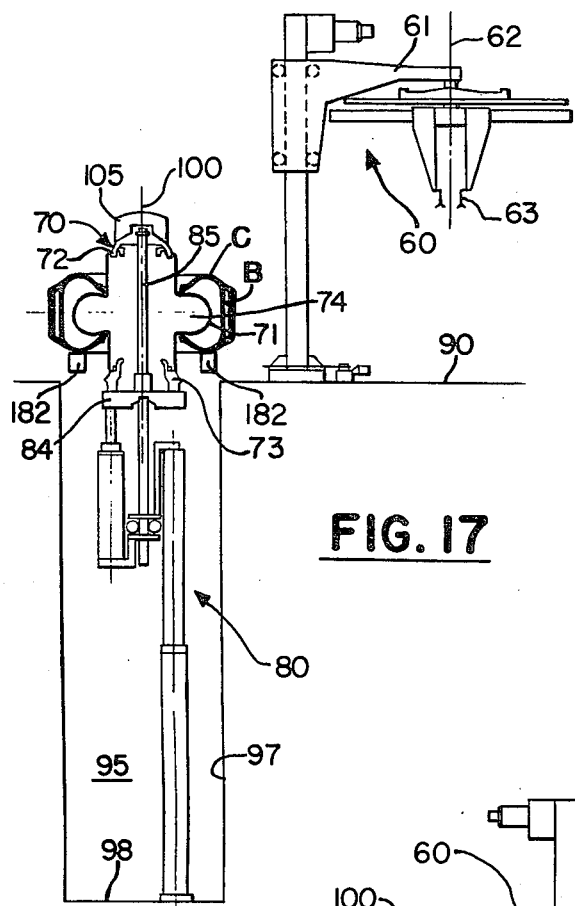

United States Patent [19]
Rudder et al.

[11] 3,945,866
[45] Mar. 23, 1976

[54] TIRE BUILDING APPARATUS FOR LARGE TIRES

[75] Inventors: Walter H. Rudder, Gadsden, Ala.; William D. Braden, deceased, late of Stow, Ohio, by Anna P. Braden, executrix; Charles J. McEvoy, Topeka, Kans.; Stokes R. Dodson, Jr., Topeka, Kans.; John R. Thiele, Topeka, Kans.; Allen L. Livgren, Topeka, Kans.

[73] Assignee: The Goodyear Tire & Rubber Company, Akron, Ohio

[22] Filed: May 24, 1974

[21] Appl. No.: 473,119

[52] U.S. Cl............. 156/126; 156/128 R; 156/133; 156/394
[51] Int. Cl.²........................................ B29H 17/37
[58] Field of Search............ 425/38; 156/128 I, 126, 156/127, 110, 132, 394, 133; 264/315

[56] References Cited
UNITED STATES PATENTS

| | | | |
|---|---|---|---|
| 2,824,336 | 2/1958 | Weigold et al...................... | 425/31 |
| 2,974,714 | 3/1961 | Kraft................................... | 156/127 |
| 3,244,575 | 4/1966 | Sabo et al....................... | 156/132 X |
| 3,380,115 | 4/1968 | Soderquist............................ | 425/38 |
| 3,396,221 | 8/1968 | Balle et al........................... | 264/315 |
| 3,550,196 | 12/1970 | Gazuit................................ | 425/29 |
| 3,738,893 | 6/1973 | Edler................................. | 156/394 |
| R19,895 | 3/1936 | State.................................. | 156/126 |

FOREIGN PATENTS OR APPLICATIONS 239,897  7/1962  Australia............................. 156/126

Primary Examiner—William A. Powell
Assistant Examiner—John E. Kittle
Attorney, Agent, or Firm—F. W. Brunner; R. S. Washburn

[57] ABSTRACT

A first stage radial ply carcass and an endless breaker belt are built conventionally about horizontal axes. Carcass and belt separately are upended, to axis-vertical positions. The respective mid-circumferential planes of the carcass and the belt are made coplanar and coincident about the vertical axis of a shaping and curing core, without fixed reference to the vertical axis. The core is raised, into and through the carcass and expanded, first to support the carcass without significant radial deformation due to gravity, and then to expand the carcass to adhere the belt therearound. The assembly of core and belted carcass is then returned to horizontal orientation to receive tread therearound. The tire is cured conventionally while the shaping core remains in the tire, still inflated, preferably with an inert gas.

18 Claims, 25 Drawing Figures

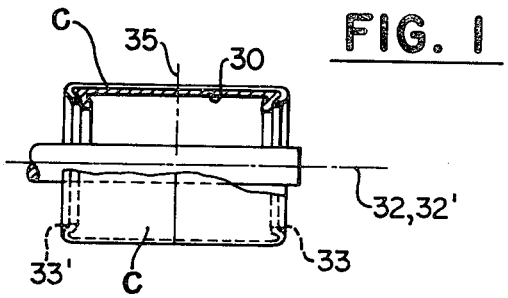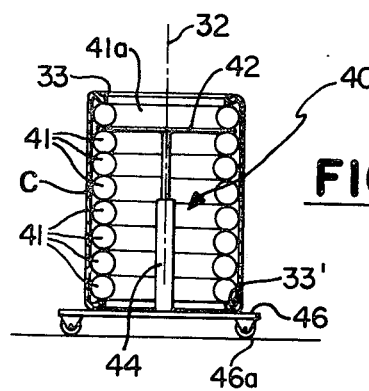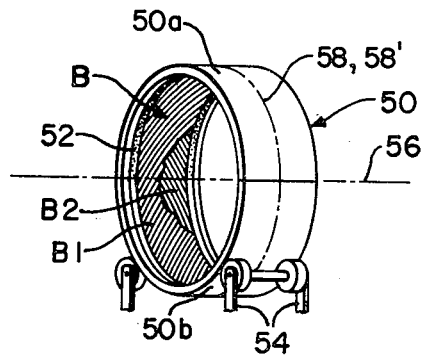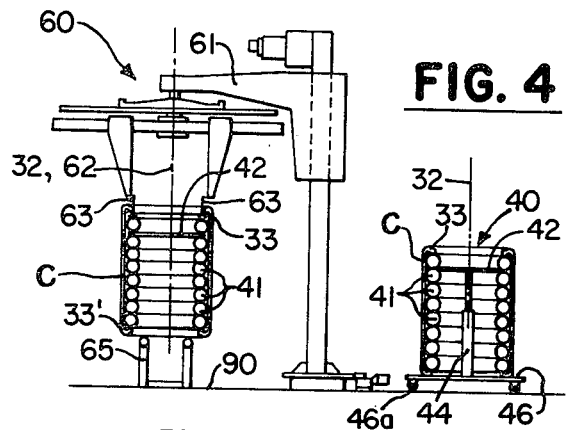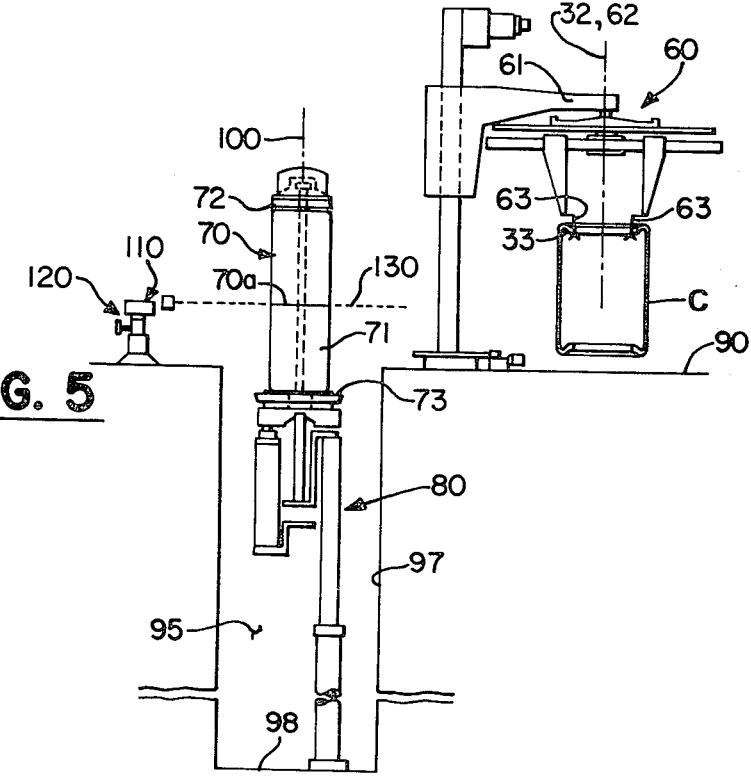

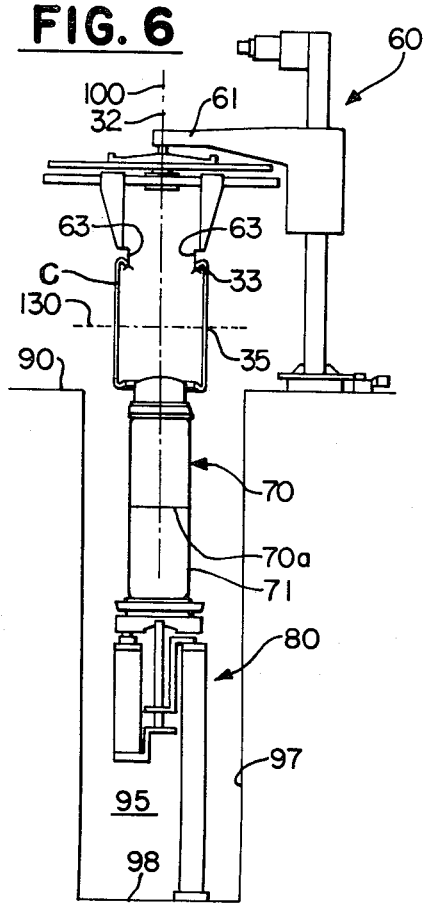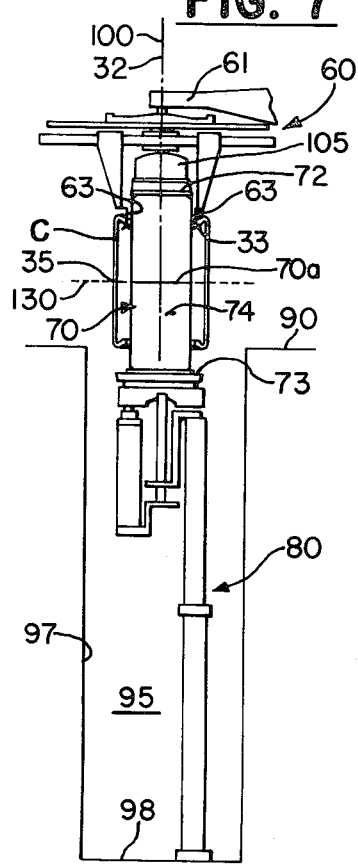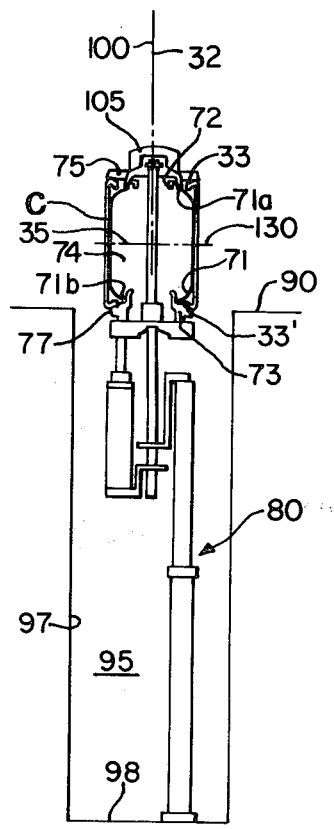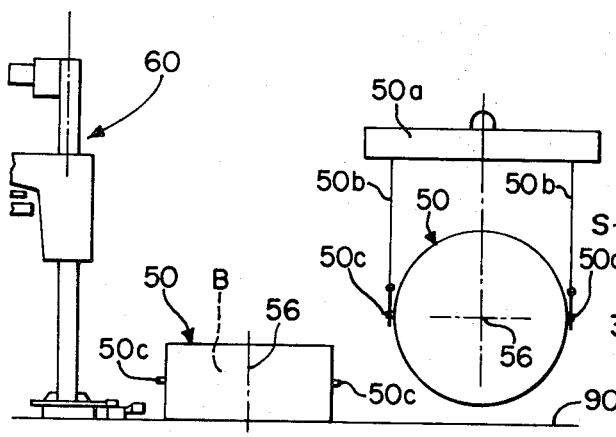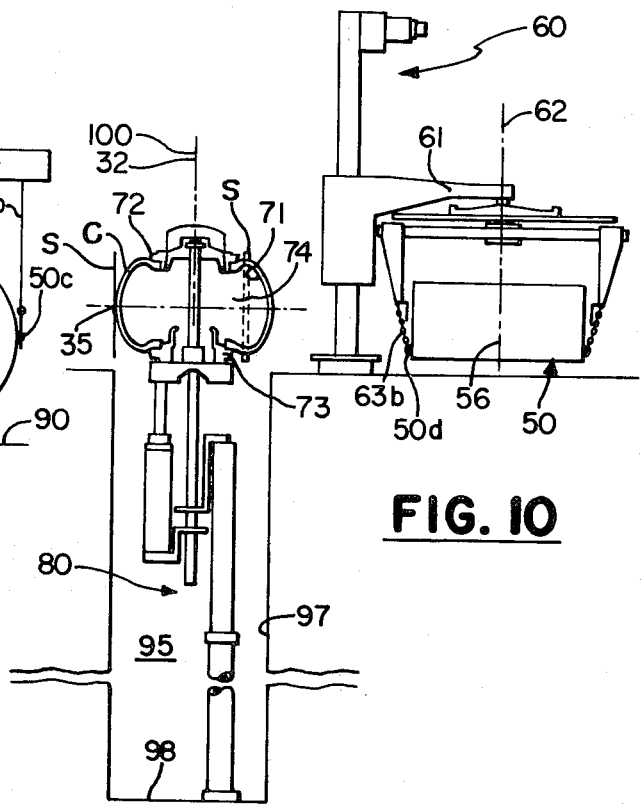

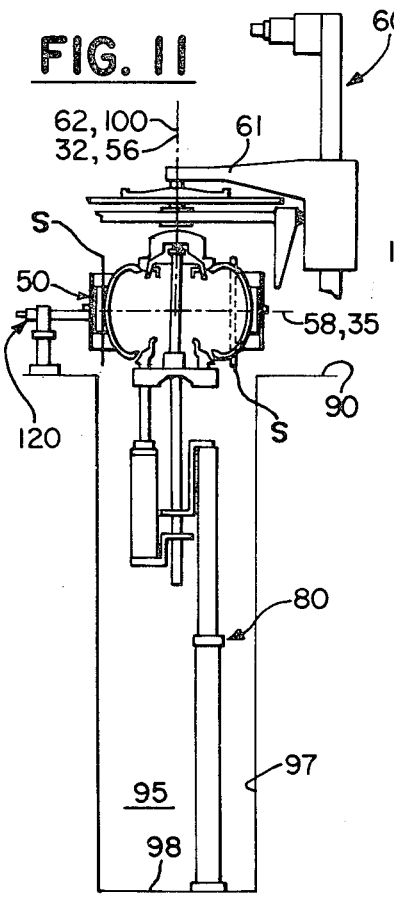
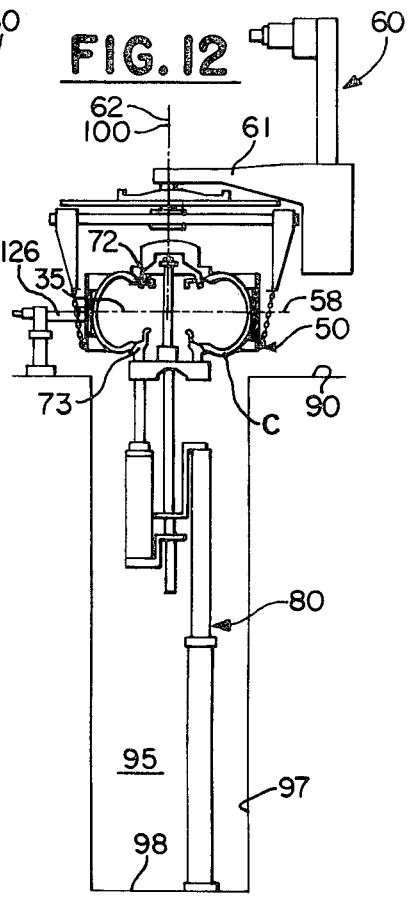
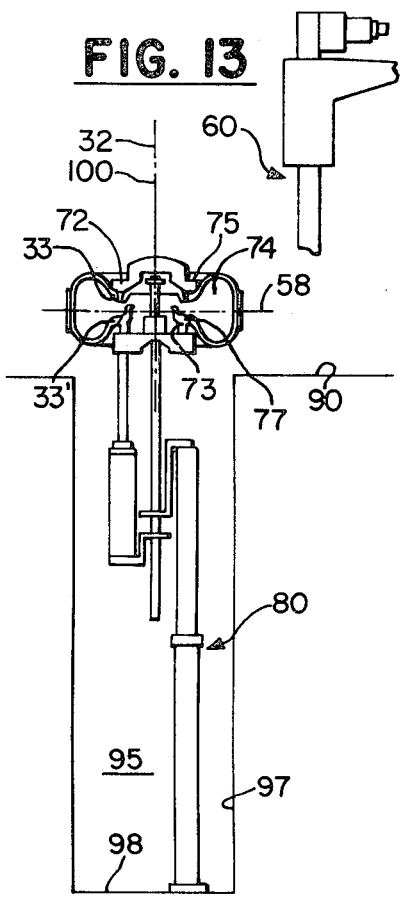
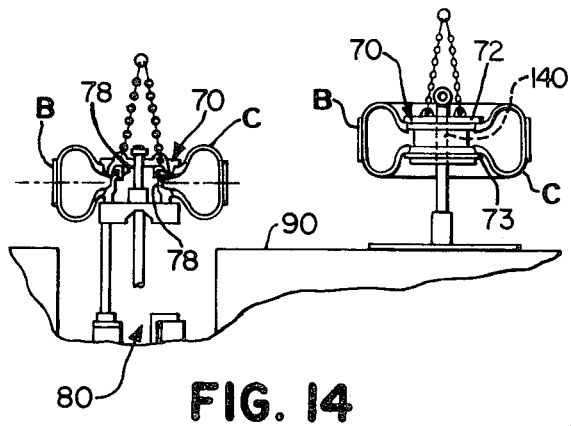
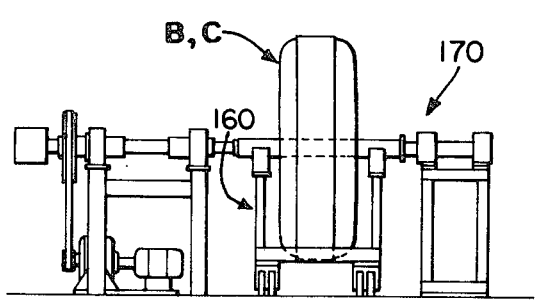
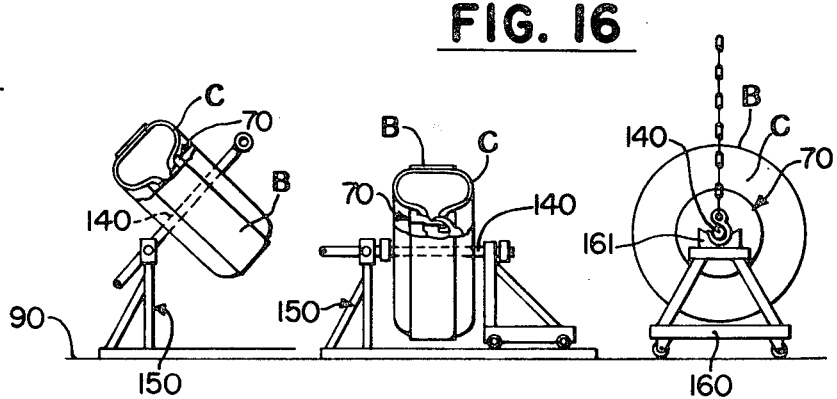

TIRE BUILDING APPARATUS FOR LARGE TIRES

The foregoing abstract is not to be taken as limiting the invention of this application, and in order to understand the full nature and extent of the technical disclosure of this application, reference must be made to the accompanying drawings and the following detailed description.

The present invention is related to building tires and particularly to building tires of great size and weight as compared to, for example, relatively much smaller tires for road vehicle use.

Because of the comparatively great size and weight of the tires of the class described herein, such tires in the uncured state are readily deflected and deformed from their designed shape by only their own weight. This is particularly true in such tires wherein the reinforcing cords of the ply or plies cross the mid-circumferential plane of such tire at, or very nearly at, 90°, as in radial ply tires. In such radial ply tire, the carcass comprises a single or at most few carcass plies and, in the uncured state is limp and flaccid, in contrast to the large number of carcass plies used in massive tires of the prior art. In tires having a large number of bias plies disposed in successively alternating bias angles across the mide-circumferential plane of the tire, the resulting carcass, even in its uncured state, is less subject to deformation due to its relatively greater muliple ply construction stiffness. As used in the present specification including the appended claims, the term, tire of the class described, refers particularly to tires of great section width, diameter, and relatively large section periphery from bead to bead, coupled with a relatively thin section wall due to the presence of a single or at most relatively few plies, usually of metallic cable or filament construction. Such tires of the class described are also characterized by always including in or beneath the tread thereof a circumferentially restrictive breaker belt of relatively inextensible circumferential length greater than the circumference of the flat band carcass as built for such tire. Tires of the class described are represented by tires for large earthmoving machines, for example, of sizes of 18.00 × 24 and larger.

In the heretofore practiced construction of tires of the class described by classic methods about horizontal axes, a deflection due to the weight of the uncured carcass, even without a tread, occasioned a sag or deformation radially inwardly above the horizontal axis and radially outwardly below the axis. This sag is believed to have contributed sometimes to a displacement of portions of the carcass with respect to the mid-circumferential plane, relative to a desired symmetry of the construction with respect to such plane.

A principal object of the present invention, therefore, is to provide methods and apparatus by which tires of the class described can be built more accurately as well as more economically.

Figure 18:
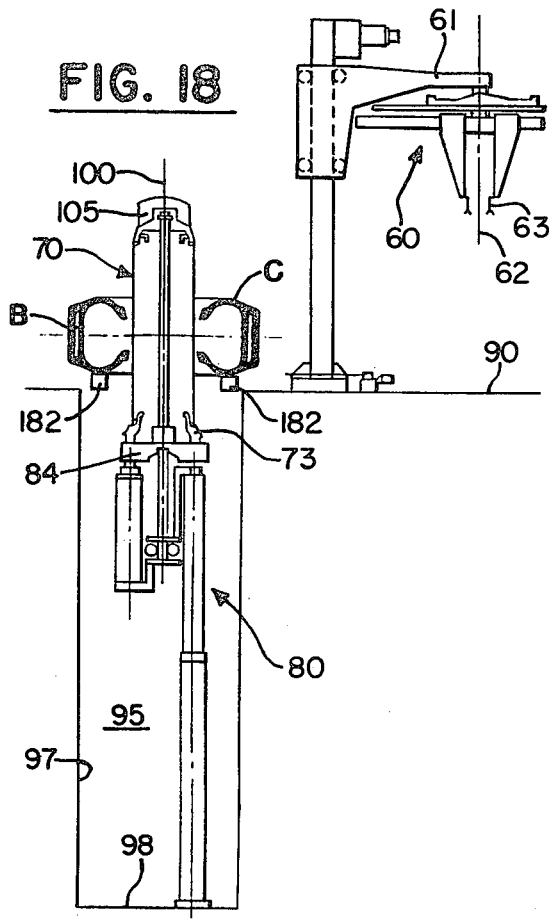
Figure 19:
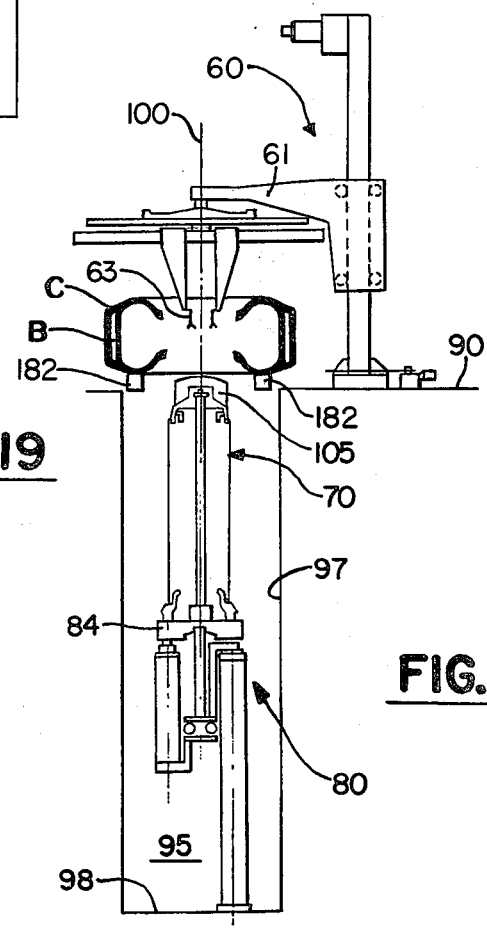

Further objects and advantages will become apparent from the following description of preferred embodiments of the invention and from reference to the attached drawings in which:

FIGS. 1–19 illustrate steps of a preferred method of building a tire of the class described. In particular, FIG. 1 shows schematically a conventional horizontal tire carcass and building drum. FIG. 2 illustrates means for and a step of transferring the nonself-supporting carcass from the carcass building step of FIG. 1 to subsequent operations. FIG. 3 shows schematically means for and the step of constructing an inextensible breaker-belt later to be combined with the carcass in accordance with the invention. FIGS. 4–8 illustrate means for and successive steps of lifting the carcass and inserting a shaping core into the carcass of FIG. 1 in accordance with the invention. FIGS. 9–13 illustrate the steps of and means for placing the breaker belt of FIG. 3 about the carcass of FIG. 1. FIGS. 14–16 show further steps of handling the combined carcass and breaker-belt. FIGS. 17–19 illustrate removal of the core from the tire after curing thereof.

Figure 20:
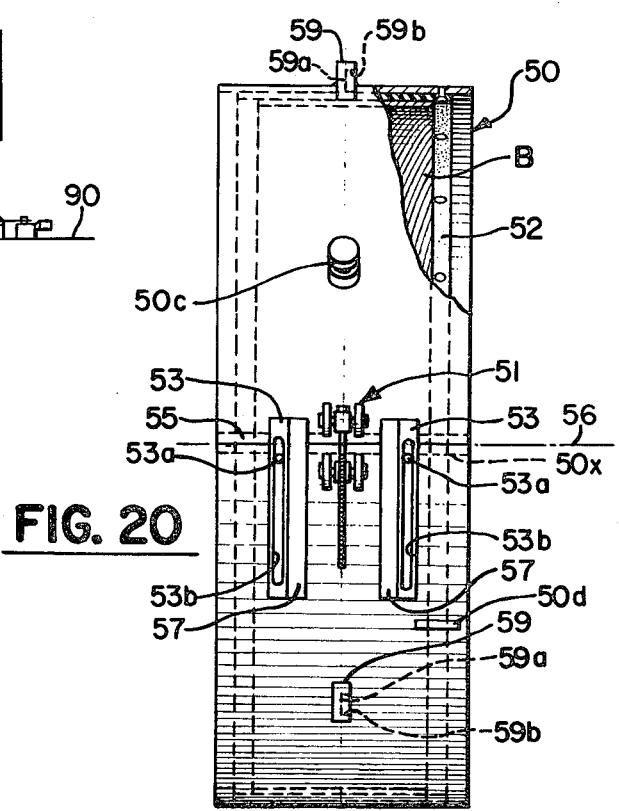
Figure 21:
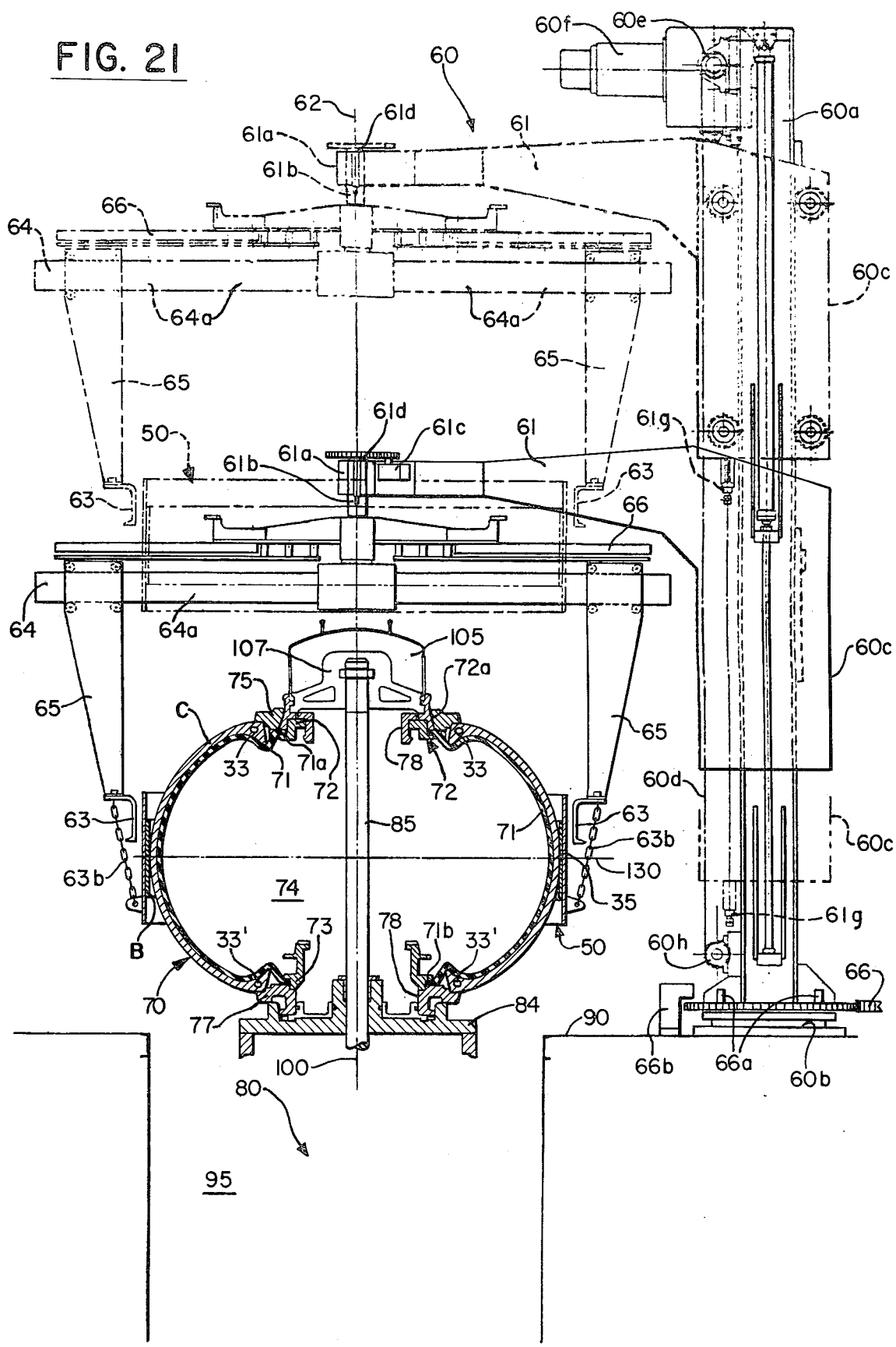
Figure 22:
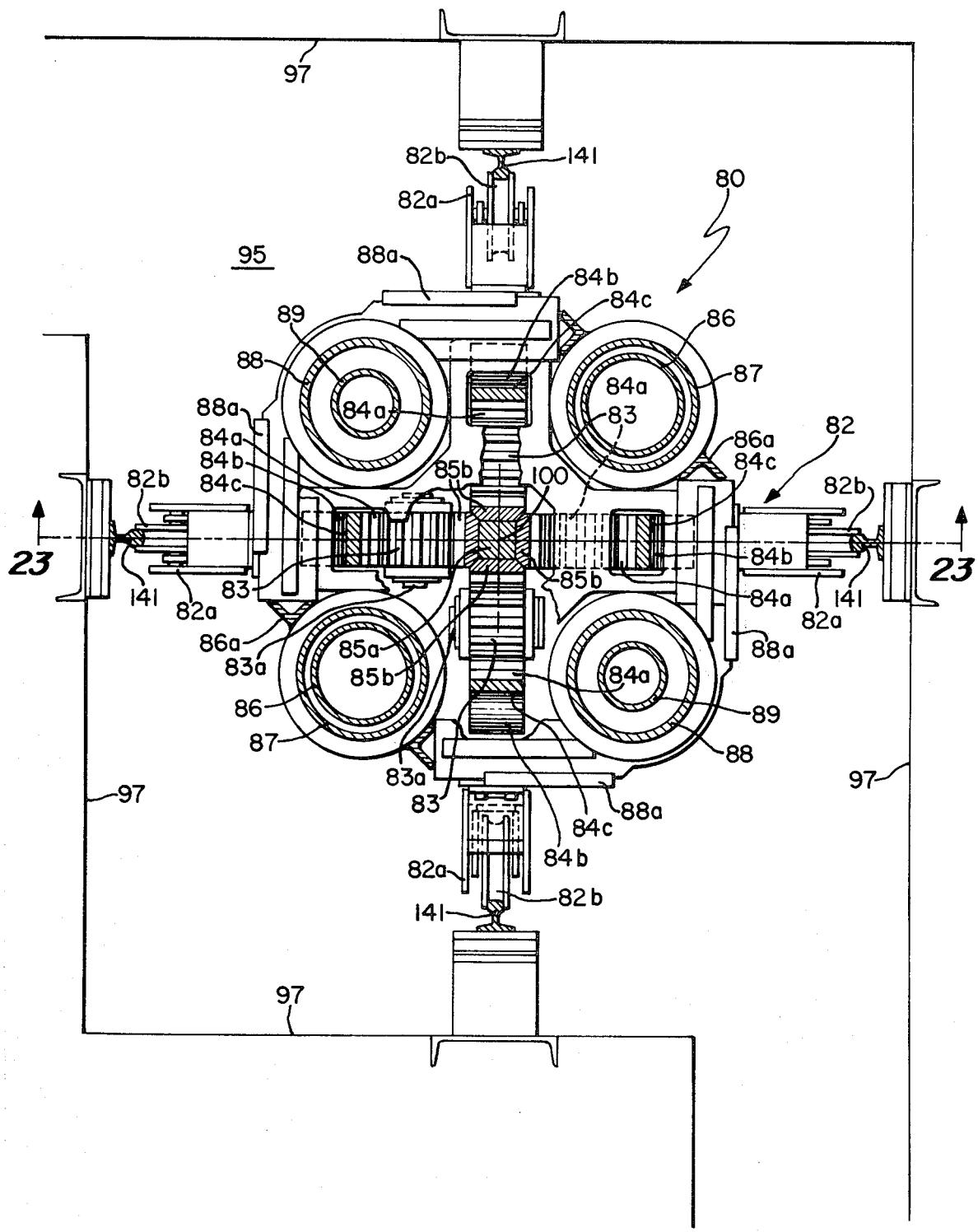
Figure 23:
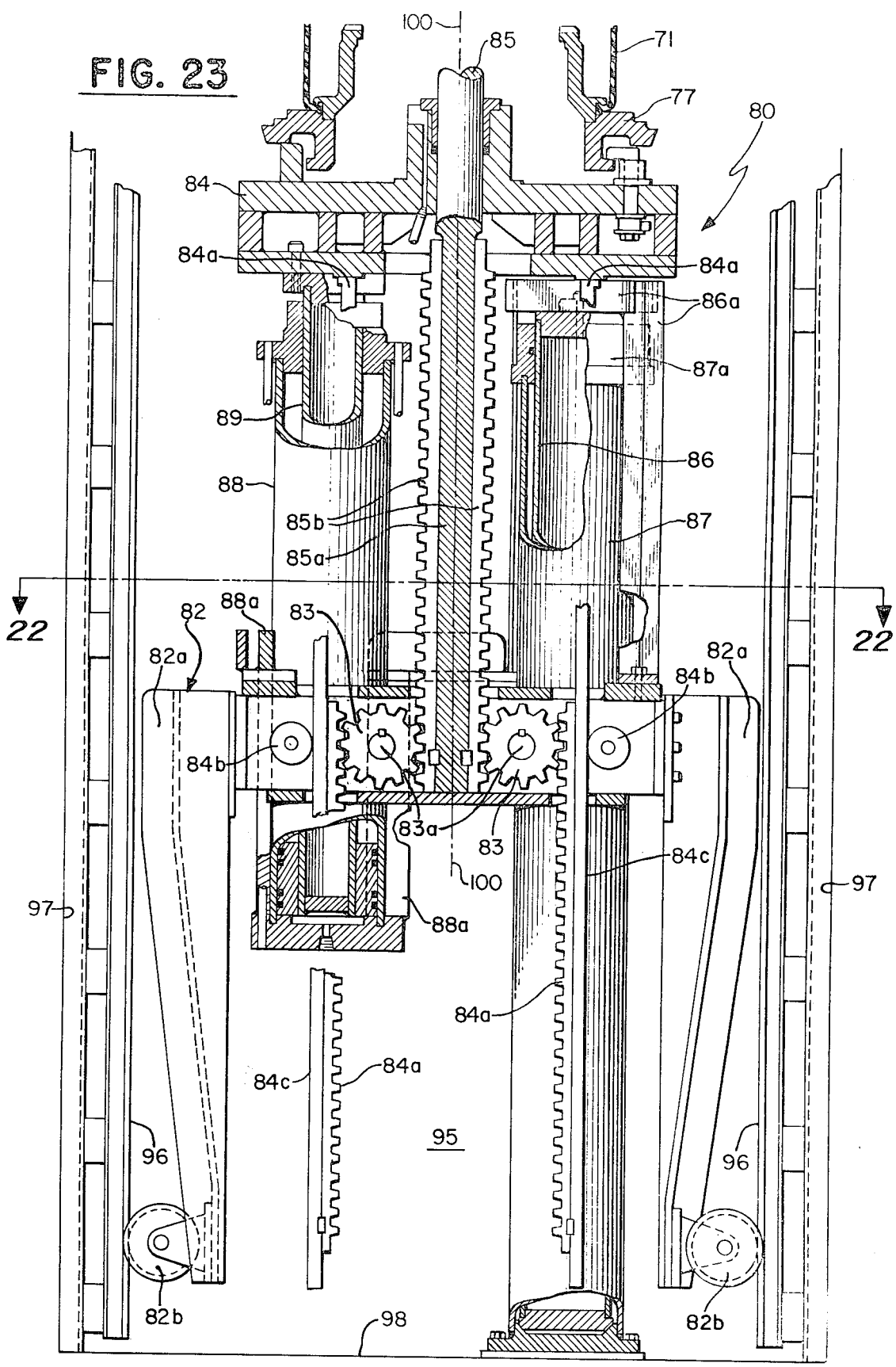
Figure 24:
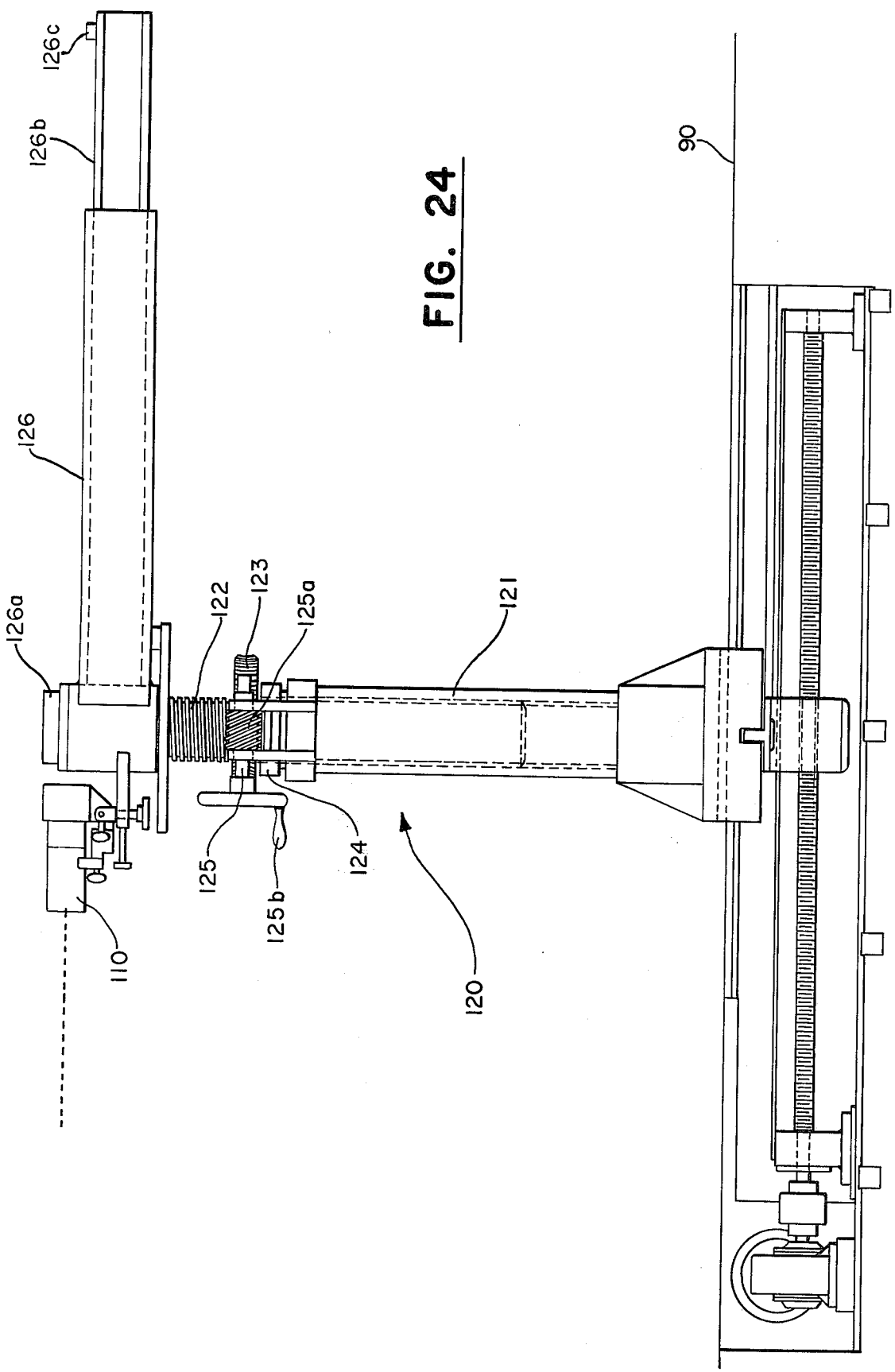
Figure 25:
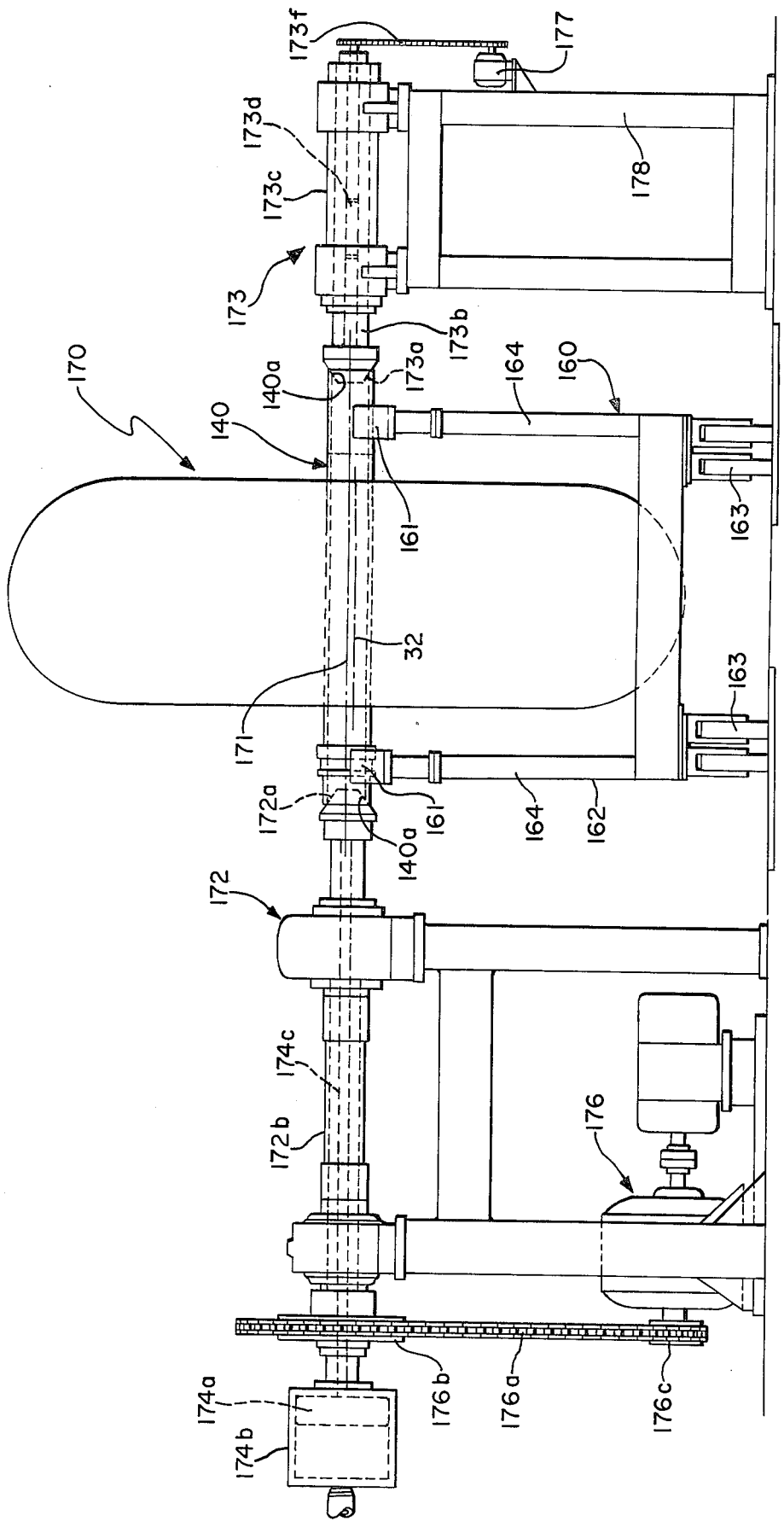

FIGS. 20–25 illustrate in more detail features of the apparatus in accordance with the invention. FIG. 20 shows the breaker-belt building means of FIG. 3. FIG. 21 illustrates the carcass lifting means, as well as the tire shaping and curing core, shown schematically in FIGS. 5–8, 10–13, and 17–19. FIGS. 22–23 show the core inserting apparatus according to the invention. FIG. 24 shows apparatus according to the invention for positioning the breaker-belt relative to the carcass and the core, and FIG. 25 illustrates apparatus of the invention for consolidating the breaker-belt and carcass, as well as a tread thereon, to complete the uncured tire.

Practice of the method of the invention, in the presently preferred mode, begins with the building of a tire carcass C illustrated schematically in FIG. 1. The carcass C is also commonly referred to as a firststage carcass and can be built in any known or preferred manner by winding, about a rigid cylindrical surface of a collapsible tire building drum 30, a ply or plies preferably including radial wire cord reinforcement into an endless cylindrical form coaxial about the horizontal axis 32' of the drum. The usual tire beads 33, 33' are placed on or adjacent the respective axial ends of the cylindrical ply and the axial ends of the ply are wrapped about the beads in any known manner. This first-stage carcass C can include also any of the circumferentially expandable components, such as sidewalls, shoulder wedges, and like components of a complete tire of the class described. As is commonly done, the mid-circumferential plane of the carcass is determined and represented on the carcass by a visible line 35 before the carcass is removed from the drum.

After completing such first-stage carcass C, the carcass is removed from the building drum 30 and upended by rotating the carcass and its own central axis 32 from its horizontal orientation to a vertical orientation, as is indicated in FIG. 2. In its vertical orientation, the carcass is placed on the carcass transporter 40. The upending step can be carried out in any suitable manner. Preferably, the first-stage carcass, as it is being removed from the drum, is immediately supported by fluid pressure acting outwardly symmetrically of its axis 32 by placing a plurality of inflatable tubes such as the innertubes 41 of suitable size inside the carcass. In the carcass transporter 40, vertical support is provided by inserting a rigid plate 42 and one of the tubes 41, the tube 41a, into the interior of the carcass in such manner that when the carcass is upended the plate 42 supports the uppermost innertube 41a which is urged by inflation air pressure within, both upwardly toward the upper bead 33 of the upended carcass and radially outwardly uniformly toward the adjacent sidewall and shoulder portion of the carcass C. As an equally useful alternative, the tube 41a can be omitted and the peripheral edge of the plate 42 can be provided with a rounded or toroidal protective cover such as a length of suitable hose fastened to and about the plate. In turn, the plate 42 is supported on a post 44 which is carried erect on a platform 46. The post 44 is made telescopically adjustable so as to be lowered when the carcass C is later removed as well as to accommodate different sizes of first-stage carcasses. For further support against undesirable deformation, additional innertubes are placed, as shown, in the interior of the carcass and suitably inflated to form a regular and coaxial stack of tubes between the lower bead 33' and the plate 42. The height of the post 44 supporting the plate is adjusted to carry all or very nearly all of the weight of the carcass and of the tubes 41. The platform 46 can be provided with wheels 46a for mobility, or be transported otherwise if desired.

Turning to FIG. 3, a circumferentially endless breaker-belt B is constructed, while the first-stage carcass C is being constructed, and at a location independent of and apart from the location where the carcass C is built. The breaker-belt B can be constructed by any known method and apparatus. In the presently preferred embodiment of the invention, the breaker-belt B is assembled inside a cylindrical ring 50 provided with a ring liner 52 comprising a substantially continuous circumferential length of flexible material, such as a length or a plurality of lengths of conveyor belting removably secured to the inner cylindrical surface of the ring 50. The ends of the belting composing the ring liner 52, when in place, meet but do not overlap. The ring is mounted on supports shown schematically at 54 enabling the ring to be rotated about its own axis 56 while an operator positions successive plies such as B-1, B-2 of the breaker belt B, splicing each of the several plies one at a time until the selected number of plies have been assembled. As will be appreciated, each of the successive plies, for example, plies B-1 and B-2, will be located symmetrically with respect to the mid-circumferential planes 58 of the belt and 58' of the ring 50. The ring 50 serves not only as a form in which the breaker belt is constructed but also serves, as will presently be shown, to transport the breaker-belt B and to cooperate, with apparatus to be described, to apply such breaker-belt B to the first-stage carcass C at a later stage in the operation being described.

Turning to FIG. 4, the carcass transporter 40 is moved with the carcass C thereon to a position adjacent the carcass lifting means, provided by the crane 60, such that the boom 61 of the crane can be moved to locate its lifting axis 62 in at least approximate collinear alignment with the axis 32 of the carcass C. The carcass is then grasped by the fingers 63 at uniformly spaced coplanar locations within the upper bead 33. The fingers 63 can readily displace the yieldable innertube 41 sufficiently not to interfere with lifting the carcass. The carcass can, if desired, by grasped about the outer surface of the carcass instead of the inner surface of the bead.

The boom 61 is then elevated, lifting the carcass C keeping its axis 32 vertical. The boom and carcass are swung to a position above a safety stand 65 where an operator can remove tubes 41 and the plate 42 through the lower bead 33' and open end of the carcass. To avoid the need for excessive height of the lift of the carcass, the telescoping post 44 is lowered.

In FIG. 4, the first-stage carcass C as illustrated is then supported only by the grasp of the eight lifting fingers 63 spaced uniformly about the inner circumference of the bead 33, and while so supported the carcass is moved to the position shown in FIG. 5.

The carcass shaping and curing core 70 is moved upwardly by the core inserter 80 to a suitable height above the operating floor 90, along its own vertical axis 100. Three height gauges 110, one of which is shown in FIG. 5, are disposed at equal angles about the axis 100 and are adjusted into a coplanar relation with the mid-circumferential plane 70a of the core sleeve 71 of the core 70. The actual mid-circumferential plane of the core need not be exactly level or exactly perpendicular to the vertical axis 70, as will be noted later herein. The gauges 110 are each fixed respectively on one of three independently adjustably elevated support stands 120. The height gauges, having been so adjusted, define a first reference plane 130. The height gauge 110 can be a light line projector by which a narrow horizontally extending light beam can be projected to coincide with a line or mark placed on the sleeve 71 at its mid-circumferential plane 70a. Alternatively, a height gauge in the form of a pointer can be moved radially normal to the axis 100 to approach closely or to touch the line or mark on the sleeve 71. The respective stands 120 are thereby adjusted to the reference plane 130 representing the mid-circumferential plane of the core 70 in accordance with the settings of three height gauges.

The core 70 is next lowered sufficiently into the pit 95 to permit the carcass C to be moved to position its own now vertical axis 32 in substantial alignment with the vertical axis 100 as illustrated in FIG. 6 of the core 70. The boom 61 and carcass C are lowered to locate the line 35 in the reference plane 130 as determined by the previously set height gauges 110. The carcass continues to be supported only be the fingers 63.

Turning to FIG. 7; after the carcass C has been positioned above and in vertical alignment with the core 70, the core is again elevated into and through the suspended carcass to a height which repositions the mid-circumferential plane 70a of the sleeve 71 in coplanar alignment again with the previously established reference plane 130 and, therefore, with the mid-circumferential line 35 of the carcass.

Also, or alternatively, the core 70, which at this step is extended to a length greater than the axial length of the carcass, can be visually observed to be located in correct axial registry with the carcass within satisfactory limits.

Before the fingers 63 are moved clear of the carcass C, the core 70 is expanded to support the carcass by admission of air into the core chamber 74. Air, preferably air from which the oxygen has been removed, or an equivalent inert gas, is admitted to the cavity at an above atmospheric pressure of about one-half atmosphere, which pressure is then maintained without decrease until the tire is placed in the mold.

As illustrated in FIG. 8, the sleeve ends 71a and 71b, which are coaxially and airtightly attached, respectively, to the rigid core ends 72 and 73, are then moved toward each other and toward the reference plane 130 while the sleeve 71 is expanded radially to an extent sufficient to bring the sleeve into circumferential engagement with the inner surface of the carcass C in an axially central zone thereof extending across the plane of the mid-circumferential line 35 but spaced inwardly from the respectively upper 33 and lower 33' beads. The beads of the carcass are not at this time engaged by the core. Engagement of the expanded sleeve 71 with the carcass is sufficient alone to support the weight of the carcass and to permit the fingers 63 to be disengaged and moved away.

While the carcass C is supported only by the sleeve 71, FIG. 8, an upper bead mold ring 75 is lowered around the pressure dome 105 and secured concentrically on the upper core end 72. Both the ring 75 and the lower bead mold ring 77 form parts of the mold (not shown) in which the tire is to be cured, as well as of the core 70, and like the core, remain with the carcass C throughout the sequence of operations from the initial shaping of the carcass as seen in FIG. 8, until the tire has been molded and cured.

At this point, it should be noted that the weight of the carcass in a tire of the class described can tend to deform the sleeve 71 sufficiently to shift the actual or true mid-circumferential plane 70a of the sleeve and/or line 35 of the carcass C a small but measurable amount downwardly with respect to the reference plane 130. An advantage of the present invention is that such deformation has no appreciable effect on the symmetrical relation of the carcass to its own axis 32. However, in the event that the mentioned deforming of the sleeve or possible movement of the carcass relatively of the sleeve tends to shift the actual mid-circumferential line 35 of the carcass out of parallel with the reference plane, according to the invention such misalignment can readily be dealt with, as will presently appear.

Turning now to FIG. 9; while the carcass C is supported alone by the core 70, the previously described ring 50 together with the breaker-belt B therein is apended, rotating the axis 56 of the ring and belt from horizontal orientation to a vertical orientation by employing, for example, a strong back or beam 50a having two lifting cables 50b which engage the trunions 50c and an overhead crane or hoist (not shown) to lift and then to rotate the ring. With its axis vertical, the ring 50 together with the breaker-belt B are disposed adjacent the crane 60. To locate the ring and breaker-belt suitably in relation to the crane, a target may be painted on the floor and, as seen in FIG. 10, the carcass lifting boom 61 is moved to position its lifting axis 62 collinear with the now vertical axis 56 of the belt and ring.

The upper 72 and lower 73 core ends are moved equally closer toward each other and toward the reference plane 130 while additional gas is introduced into the cavity 74 so that the carcass is expanded to a diameter slightly less than the inside diameter of the breaker belt B to be applied. Because of the possible movement of the actual true mid-circumferential line 35 of the carcass as previously discussed, the support stands 120 can be again adjusted vertically as necessary to accord with the actual position of the mid-circumferential line 35 of the carcass itself, independently of the previously established reference plane, so as to locate the ring 50 and the belt B is suitable coplanar relation with the actual position of the line 35. This relation can be accomplished by using the height gauges 110 to adjust as may be required after the partial expansion of the carcass the respective elevations of the support stands 120 before placing the ring thereon. It will be apparent that radial space between the circumference of the partially expanded carcass and the inner surface of the belt must be provided to allow the ring and belt to move into the required coplanar relation, and further that the line 35 will then be inaccessible to direct view and measurement. Moreover, some additional movement of the carcass can occur during its further expansion toward contact with the belt. As a preferred alternative to the above step, we temporarily attach or adhere to the carcass, in at least approximate alignment with each of the support stands 120, a gauge strip S, as illustrated in FIG. 10. Each strip S is a straight length of thin metal about three-quarters inch in width having a zero mark placed at the line 35. Each gauge strap is so attached as to extend parallel to the axis 32 beyond the respective upper and lower edges of the ring 50 and has a suitable alignment mark to which an edge of the ring can be registered visually. The ring 50 and the belt are then moved by the crane 60, first to align the axis 56 with the axis 100 then to place the ring on the support stands. The stands 120 can then be adjusted individually as required to register one, or both, edges of the ring with the alignment marks on the gauge strips when the carcass has been expanded almost to touch the belt.

The true mid-circumferential plane 58 of the belt B is thereby disposed in coplanar relation with the actual true position of the mid-circumferential line 35 of the carcass, independently of the previously discussed reference plane.

As may be seen in FIG. 12, the carcass C is then further expanded into adherent contact with the breaker-belt B while the core ends 72 and 73 are moved equally closer toward each other and toward the mid-circumferential plane 58. The gauge strips S can then be easily removed. When the carcass and the belt and adhered to each other, the flexible connectors 63b are attached to three of the lifting fingers 63 and to the eyes 50d to lift the ring vertically from the assembled carcass and belt. The ring liner 52 remains adhered to the belt while the ring 50 is being removed. The belting forming the liner 52 can then easily be peeled from the assembled breaker-belt and carcass, and subsequently be replaced in the ring for reuse.

FIG. 13 illustrates a further stage in which the core ends 72,73 and the bead mold rings 75,77 fixed respectively thereon are moved closer together to their final, axially spaced, relation wherein the beads 33,33' of the carcass are spaced apart by the distance therebetween at which the tire is to be cured. Then the core ends are locked to one another rigidly fixing such distance.

The cooperation of the vertically adjustable support stands with the breaker belt ring 50 yields a further and important advantage in that the core inserter 80 can be less complex and expensive than the classic horizontal axis tire building apparatus. In the latter, complex and expensive mechanism is required for aligning a breaker belt and a carcass in reasonably accurate coaxial relation. In contrast, a core inserter oriented along a vertical axis according to the present invention can readily accommodate some tilting of the axis from the true vertical such that the mid-circumferential plane of the core and of the carcass may not be exactly level but by appropriate readily made adjustment of the support stands 120 to the actual mid-circumferential plane, the belt can be applied to the carcass in symmetrical alignment with the mid-circumferential plane of the carcass within limits at least as small as could be obtained by horizontal axis apparatus of comparable size. The core inserter of the invention, therefore, does not require closely fitted slide ways and the like to obtain very satisfactory accuracy in shaping the carcass and applying the breaker-belt.

Moving on to FIGS. 14 and 15, the now united carcass and belt with the core 70 expanded and secured therein are next lifted as a unit from the core inserter 80 and lowered coaxially onto an arbor 140 which is accommodated in coaxial open bores in the core ends 72,73. The core, carcass and belt assembly, including the arbor are then turned from the axis-vertical to an axis-horizontal position aided by the tilting device 150. From the tilting device, the assembly on its arbor is transferred to a transfer truck 160 in which the arbor is supported by the semi-cylindrical saddles 161 in which the arbor 140 is supported with the core between the two saddles.

The truck 160 is then moved to a tire rotating stand 170, which is located apart from the core inserter 80, in which stand the breaker-belt B and carcass C are rotated in stitching contact with conventional stitching mechanism (not shown) and further consolidated. The stitching mechanism is not, as in the prior art heretofore, associated immediately with the tire building drum on which assembly of carcass and breaker belt are performed.

After the breaker-belt has been consolidated with the carcass, the shaped and belted carcass is transported by the truck 160 to a further station (not shown) whereat a circumferentially endless tread is applied, preferably in the form of a continuing plurality of revolutions of a cord, ribbon, or flat band of tread compound wound continuously about the belted carcass to form the full depth of tread desired. After the tread applying operation, the tire is returned to the stand 170 and the so-applied tread is also stitched and consolidated to the belted carcass, after which the assembled uncured tire on the core is placed as a unit in a curing mold. It should be noted here that, as previously mentioned, the upper and lower bead mold rings 75,77 form parts of the mold in which the uncured tire is placed and which mold then is subjected to heat and to internal pressure for molding and curing the tire. The gas pressure introduced into the core 70 during the initial shaping of the carcass is not decreased therein throughout the operations following the first introduction of pressure into the carcass.

After the tread has been applied to the belted carcass and before the uncured tire is placed in a mold for curing, the assembled carcass, core, and arbor are slowly rotated, at about one revolution per minute to avoid radial distortion of the uncured tire which can otherwise result from the weight of the tread applied to the carcass. The saddles 161 of the truck 160 provide bearing support for rotation of the arbor 140.

After the in-mold curing of the tire has been accomplished, the tire with the core 70 remaining (see FIG. 17) therein is removed from the mold and carried back to the core inserter 80 and placed upon a parallel pair of beams 182 placed across the pit 95 to support the tire. The upper and lower core ends 72,73 73 are disengaged from each other. The lower core end 73 is again secured to the platen 84 and the upper core end 72 is again secured to the shaft 85 by the spider 107 and the pressure retaining dome 105 is reaffixed, whereupon the core ends 72,73 are moved away from each other which movement operates to withdraw the sleeve 71 from the tire.

As seen in FIG. 18, after the core ends have been moved apart to the maximum extent and the sleeve extended therebetween to assume its minimum diameter, the core 70 is lowered into the pit 95 to the position illustrated in FIG. 19 whereupon the boom 61 may be swung over the pit and lowered to pick up the tire and to carry it away from the inserter. The boom is then ready to return with a first-stage uncured carcass C to repeat the sequence of operations described.

Apparatus

The invention further includes apparatus about to be described which is particularly suited to the practice of the method hereinbefore described.

Breaker-Belt Assembly, Transport, and Applying Means

The ring 50 shown but schematically in FIG. 3 is illustrated in greater detail in FIG. 20. This ring serves as a building form providing means for building a breaker belt from a plurality of plies in a conventional manner. In accordance with the invention, the belt buiding ring 50 is provided with means which cooperate to serve also for handling the breaker-belt, particularly for turning the belt from an axis-horizontal position as built to an axis-vertical position, and for transporting the belt. The ring serves further for positioning the breaker-belt relative to the carcass and for applying the breaker-belt to the carcass as the latter is expanded, which operations have been described hereinabove.

The ring 50 comprises an arcuate steel plate formed as a cylinder. The respective ends of the plate are clamped together to form the complete cylindrical ring or released by a pair of turnbuckle clamps 51 or the like.

In constrast to belt-transferring devices of the prior art, the ring 50 is, in the present embodiment, an endless ring not subject to radial enlargement during the practice of the invention. We have found, however, that by providing a single cylindrical plate with a separation or parting line 55 which is held closed in rigid endless form during use, a further advantage can be obtained. The opposing ends of the plate can be separated sufficiently to accommodate an extension plate 50x which is inserted and held fixedly to the opposing ends of the cylindrical plate so as to enlarge the circumference of the ring 50 as much as about 6 inches and thereby economically accommodate minor differences in the belt circumferences of different tires without altering the rigid endless character of the ring 50 while assembling any single tire.

The ends of the plate are retained in alignment by slidable links 53 attached to one end of the plate to extend across the parting line 55 into engagement respectively with a pair of slides 57 attached to the matching other end of the plate. For lifting the ring 50 to and from its position surrounding the carcass, flexible connectors, such as the short, and equal, lengths of chain 63b, are removably attached to the crane arms 65 adjacent the fingers 63. Each chain 63b has a hook engageable in a respective one of the lifting eyes 50d secured on the ring 50. Although equivalent means of connecting the ring 50 to the boom 61 may be readily apparent to persons skilled in the art, we have found the use of the chains 63b to be quick and simple. To position the ring and the breaker-belt therein in a coplanar relation with the mid-circumferential line on the carcass, three support lugs 59 are fixed on the ring at three equal angular intervals about the axis. Each of the lugs has a surface 59a located in precise parallel relation with the mid-circumferential plane of the ring with which the breaker-belt has been aligned. In the present embodiment the surfaces 59a are provided by the flat ends of the cylindrical bores in the respective lugs. The cylindrical wall 59b of the bore protects the surface 59a against damage and provides a secure engagement with the support stand 120 which will be described presently. It will be evident that other support surfaces for engagement with support stands could be provided and it will further be evident that the support surfaces can as well be parallel to but offset from the mid-circumferential plane of the ring as well as coplanar therewith.

To facilitate release of the breaker-belt and ring from each other, the ring liner 52, previously referred to, is provided by a flexible strip or strips of conveyor belting attached to the inner cylindrical surface of the ring in any convenient manner. In the present embodiment the strips extend the full circumference of the ring so that the open ends meet but do not overlap.

Carcass Lifting Means

Turning now to FIG. 21, the carcass lifting means, the functions of which have been made apparent throughout the successive stages of the method already described, is illustrated more completely in FIG. 21. While the functions described can be accomplished by alternative means, for example, by suitably equipped gantry crane or the like, in the present embodiment, the preferred lifting means is provided by the jib crane 60 which includes the vertical column 60a mounted for rotation about its own vertical axis on a base 60b fixed to the operating floor 90 adjacent to the pit 95. A traveler 60c mounted for vertical movement up and down the column 60a carries the boom 61 which extends radially outwardly of the column. In its radially outward end 61a, the boom supports a center post 61b in line vertically with the lifting axis 62. A spreader 64 comprising beams 64a extending at equal angular intervals radially of the lifting axis are fixed to and carried by the center post 61b. One of the carcass supporting arms 65 is mounted on each of the beams 64a to move radially inwardly and outwardly of the lifting axis. A lifting finger 63, fixed on each of the arms 65, is shaped suitably to engage the upper bead portion 33 of the carcass C. These fingers can be removed from the arms 65 or interchanged with fingers particularly adapted for carcasses of other dimensions as the need arises. The arms 65 can also be employed to support a first-stage carcass by engaging the axially intermediate and radially outward surface of the carcass rather than within the upper bead of such carcass.

A scroll 66 is mounted rotatably coaxially of the center post 61b immediately above the spreader beams 64a and has a plurality of spiral grooves each of which accommodates a cam follower (not visible in the figure) associated respectively with one of the arms 65 such that rotation of the scroll controls the radial movement of the arms toward and away from the axis 62. The scroll, spiral grooves, and cam followers, are of well-known construction, hence the details thereof, not being within the scope of the invention claimed, are not further described.

The major movements of the boom 61 upward and downward along the column 60a are effected by a major lift drive including a chain 60d which passes at its upper end about a sprocket 60e driven by a drive 60f fixed at the upper end of the column. The chain extends downward about an idler sprocket 60b fixed near the lower end of the column. The respective ends of the chain are joined to the traveler 60c. In addition to the major lift drive, an inching or vernier drive 61c is mounted on the boom 61 to facilitate the precise vertical location of the lift fingers 63. Screw threads on the upper end of the post 61a engage a rotatable nut 61d held in its axial position on a thrust bearing (not shown). The nut 61d is rotated relatively of the post 61b by the vernier drive 61c to raise or lower the center post 61b and thereby the arms 65 and fingers 63 to effect minor adjustments of the vertical elevation of the fingers.

The column is rotated by a drive 66 and is controlled to locate the lifting axis 62 in alignment with the axis 100 of the core inserter 80, about to be described in greater detail, by conventional means well understood in the arts.

Vertical movement of the boom 61 relative to the column 60a is controlled by conventional limit switches.

Carcass Shaping and Tire Curing Core

The core 70 itself as illustrated in FIG. 21 comprises a radially expansible elastomeric sleeve 71 the axial ends 71a, 71b of which are fluidly tightly connected respectively to a rigid upper core end 72 and a rigid lower core end 73 which latter is removably secured coaxially on the platen 84 of the core inserter 80, presently to be more fully described. The lower core end includes the integral lower bead mold ring 77. The upper core end 72 is provided with a seat 72a on which is removably affixed the upper bead mold ring 75 which can be removed to permit the upper core end 72 to pass axially through the open center of the first-stage carcass after which the bead ring 75 can be secured on the core end 72. An open cylindrical bore 78 extends through each of the core ends to accommodate the central shaft 85 as well as an arbor 140, on which the core 70 and uncured belted carcass can be mounted. The further details of the core 70 are conventional and not within the scope of the present invention, hence do not appear to require further description.

Core Inserting Means

The core inserting means provided by the core inserter 80 in the illustrative embodiment of the present invention is shown in FIGS. 22 and 23. Movements of the core inserter 80 have been discussed in connection with the stages of the method set forth hereinabove. The core inserter comprises a rigid elevator 82 mounted for straight line movement vertically up and down. The structure 82 is provided with downwardly extending stabilizing legs 82a rigidly secured to the elevator. Each of the legs carries a wheel 82b which rolls on a vertical rail 96 rigidly mounted on a vertical wall 97 of the pit 95 in which the inserter is housed. An upwardly extending yoke 86a secured integrally to the elevator 82 is connected to the elevating ram 86 permitting the elevator 82 to move downwardly below the upper end 87a of the elevating cylinder 87. The elevator is raised and lowered by the ram 86 in the hydraulic elevating cylinder 87 which is fixed on and extends vertically upward from the floor 98 of the pit 95. In the present embodiment a pair of such cylinders 87 are disposed equally and oppositely relatively of the vertical axis 100, as shown in FIG. 22. A pair of shaping cylinders 88 are rigidly fixed to the structure 82 for movement upwardly and downwardly together therewith. The two shaping cylinders 88 are also disposed equally and oppositely relatively of the vertical axis 100 as shown in FIG. 22. Each of the shaping cylinders 88 contains a ram 89 which is fixed at its upper end to the platen 84 to which the lower core end 73 is removably attached. The shaping cylinders are each supported in a saddle 88a secured integrally to the elevator 82. The vertical center shaft 85 extends slidably through the platen 84. A spider 107 removably secured to the shaft upper end by a C-ring is locked to and released from the upper core end by a conventional serrated ring lock. The lower end portion 85a of the center shaft 85 has a plurality of gear racks 85b fixed on or made integral therewith. The racks 85b extend vertically parallel to the axis 100. Each of the racks 85b is in meshing engagement with a pinion 83 mounted for rotation about a pinion axis 83a fixed in the elevator in a plane normal to the vertical axis 100. Fixed to the platen 84 and extending downwardly therefrom parallel to the axis 100 are a plurality of racks 84a each of which is held in meshing engagement with one of the pinions 83 by a backing roller 84b mounted in the elevator for rotation about an axis parallel to and suitably spaced from the respective pinion axis 83a so that the roller bears rollably on the plain back surface 84c of the rack. It will be seen in FIG. 23 that as the rams 89 of the shaping cylinders 88 are extended to move the platen 84 upwardly the racks 84a move upwardly therewith and cause rotation of the respective pinions 83 which in turn exert downward force on the center shaft 85 by virtue of the engagement of the pinions 83 with the racks 85b on that shaft. In this way, the upward movement of the platen 84 is accompanied by an equal and opposite downward movement of the upper core end 72. In like manner, downward movement of the platen 84 as the rams 89 retract results in equal and opposite upward movement of the upper core end 72. Both of the described shaping movements are independent of the position of the elevator 82 which is itself raised or lowered by the elevator rams 86.

Support Stands

The support stands 120 shown schematically in FIGS. 5 and 11–13 are illustrated in greater detail in FIG. 24. The plurality of support stands 120, preferably three, are equally spaced about the axis 100. Since these support stands are identical, a description of one will suffice for all three. Each stand comprises a hollow post 121 extending upwardly from the floor 90. An elevating screw 122 is disposed telescopically within the post and extends upwardly, being engaged in an internally screw-threaded worm wheel 123. The worm wheel is carried on a thrust bearing 124 on the upper end of the post. A hand-wheel shaft 125 mounted in a suitable bracket fixed on the post carries a worm 125a which meshes with the worm wheel 123. The worm 125a is turned by the hand-wheel 125b to rotate the worm wheel which moves the screw 122 upward or downward in the post 121. A hollow support beam 126 is fixed horizontally on a swivel housing 126a mounted on the upper end of the screw 122, the beam 126 extending as a cantilever outwardly therefrom. A beam extension 126b slidable within the hollow beam 126 can be extended toward the axis 100 manually or moved into the hollow beam away from the axis as required in the operation described. The distal end of the extendable and retractable beam extension 126b carries the support surface 126c on which the respective surface 59a of a lug 59 of the ring 50 are placed to position the ring in the above-described coplanar relation with the mid-circumferential line 35 of the carcass C. As has been mentioned, the support stand 120 also carries a height gauge 110 by which the true actual position of the mid-circumferential plane of the carcass C is determined. The height gauge, illustrated by a light beam projector, is mounted on the housing 126a in adjustably fixed relation to the support surface 126c so that by vertical adjustment of the screw 122 the projected light beam or equivalent height gauge can be aligned with the mid-circumferential plane of the core 70 or of the carcass C as has been described hereinbefore. In this manner, the support surface 126c of each beam 126 defines one point of a plane parallel to or coplanar with the desired midcircumferential plane and the three support stands together cooperate to place the ring 50 and belt B in the desired plane, as has been described.

Means for adjusting the position of each of the stands radially of the axis to accommodate larger or smaller diameter tires as is also shown in FIG. 24 can be provided if desired.

Truck and Stitching Arrangement

Turning to FIG. 25, apparatus for the practice of the method described includes the truck 160 adapted to transport the uncured belted carcass or the tire and the core as well as to enable rotation of the tire and core assembly about the axis 32. in addition to a conventional truck frame 162 and wheels 163 thereon, a pair of uprights 164 fixed on the frame support the pair of saddles 161 previously described, which are half bearings on which the arbor 140 previously referred to can be supported for rotation about the tire axis. The truck, as has been mentioned, serves to transport the core with the carcass and belt assembly thereon, to a conventional stitching mechanism located apart from the tire drum 30 and from the inserter where the carcass and belt have been assembled. The saddles 161 are at such elevation, relative to the operating floor 90 that the tire axis 32 is supported a fraction of an inch below the rotation axis 171 of the headstock 172 and cooperating tailstock 173 of the tire rotating stand 170.

A freely rotatable coned center 173a mounted on the tailstock non-rotating spindle 173b cooperates with a driving coned center 172a mounted corotatably on a hollow driving shaft 172b on the headstock not only to mount the core and tire thereon for rotation during stitching of the belt to the carcass, and later the tread to the belt and carcass, but also to lift the arbor 140 with the tire and core assembly the aforesaid small fraction of an inch, sufficient only to separate the arbor from the saddles 161. A push rod 174c mounted coaxially in the hollow shaft 172b connects the driving center 172a with the piston 174a of a power cylinder 174b mounted at the distal end of the shaft and which is operable to move the driving center 172a toward and away from the tailstock 173. The arbor 140 has coned centers 140a formed coaxially and in each of its ends, into which the headstock and tailstock centers can be first freely entered and then, by additional fluid pressure in the cylinder 174b, forced into full engagement with the arbor thereby lifting the arbor with the core and tire thereon into coaxial alignment with the rotation axis 171. A drive motor 176 in the headstock is connected, by the chain 176a and sprockets 176b, 176c to the shaft 172b to rotate the tire at a speed or speeds suitable for stitching the belt and/or the tread.

To adjust the location of the mid-circumferential plane of the belted carcass, the tailstock spindle 173b is slidable in the tailstock tube 173c and is moved axially by a screw 173d engaged with internal threads formed coaxially within the spindle. The screw extends outwardly from the tube and is supported for rotation but axially fixed in the tube. A drive chain 173f connects the screw drivably with an air motor 177 fixed on the tailstock frame 178. The motor and screw can move the core and arbor toward or away from the headstock 172 while the piston 174a maintains thrust axially on the arbor.

When the stitching has been completed, the center 172a is moved axially away from the arbor so as to lower the arbor to rest again in the saddles.

To minimize radial distortion of the tire, particularly after a tread has been placed around the belt and carcass, it has been found advantageous to rotate the uncured tire slowly, for example, at about one revolution per minute, until the tire is transferred to a curing mold. The truck 160 and in particular the saddles 161 allow the tire to be so rotated by any suitable motor drivingly connected to the arbor 140.

By assembling a tire of the class described while the axes of the carcass, of the breaker-belt, and of the tire shaping and curing core, are vertical and coincident, the weight of the uncured tire acts parallel to and generally in line with the common axis so that any sag or distortion of such a tire has no harmful effect on the radial uniformity of the tire about its operating axis. This is contrary to the classic method of assembling tires about a horizontal axis.

By locating the mid-circumferential plane of the breaker-belt variably to suit the actual position of the mid-circumferential plane of the carcass just prior to uniting the belt and carcass, thus compensating for the somewhat unpredictable vertical sag or deformation due to the weight of the carcass, and of the shaping-curing bladder if used, the accuracy of the position of the breaker-belt relative to the mid-circumferential plane of the tire can be improved. Again, this is contrary to the classic procedure in building tires about a horizontal axis, in which no compensation for angular misalignment has been provided by the prior art.

By shaping the tire from its cylindrical to its toroidal shape and applying an inextensible breaker-belt on a curing core having a central open coaxial bore isolated from the tire cavity, less time and effort are expended in subsequent operations and quality is improved.

Capital expenditure for equipment is made less than heretofore incurred by utilizing apparatus capable both: of shaping a carcass and applying an inextensible breaker belt; and of mounting and dismounting the uncured carcass and tire on and from a curing core; as contrasted with the prior art practice of providing, for smaller tires than tires of the class described, one apparatus for shaping and applying a breaker to a carcass, and other apparatus for mounting and dismounting a tire on and from a curing bag or bladder. THis advantage is particularly enhanced in providing for manufacture of tires of the class described.

It is no longer required to dismount and remount a partially completed tire on successive different building or shaping forms, yielding an advantage in both accuracy and in cost of manufacturing. Additionally, by shaping the carcass initially with air, or preferably an inert gas, and maintaining such pressure within the core throughout the building process, less undesirable deformation of the carcass occurs during its manufacture.

While the foregoing description relates, as to utility, primarily to radial ply tires, neither the practice of the invention nor the subject matter expressed in the claims are intended in any way to exclude any tire of the class described as large and having a breaker-belt in or beneath the tread.

While certain representative embodiments and details have been shown for the purpose of illustrating the invention, it will be apparent to those skilled in the art that various changes and modifications may be made therein without departing from the spirit or scope of the invention.

What is claimed is:

1. The method of making a tire of the class described comprising:

building in cylindrical form about a horizontal axis a carcass including at least one tire carcass reinforcing ply and axially spaced apart tire beads enfolded in the respective ends of such ply;

building apart from said carcass a circumferentially endless tire breaker-belt;

unpending said carcass and said belt by rotating their respective axes from horizontal to vertical;

supporting said carcass in a vertical orientation about a vertical axis only by elastically expandable means engaging the interior surface thereof in a circumferential zone spaced axially inward of the beads and extending axially across the mid-circumferential plane of the carcass;

establishing a support plane parallel to the actual mid-circumferential plane of the so-supported carcass by positioning three support surfaces located at about equal angular intervals around and spaced radially outwardly of the carcass, each support surface being adjustable independently of the others of said support surfaces in directions parallel to said vertical axis;

then disposing said breaker-belt about and in radially spaced non-contacting relation to said carcass with the mid-circumferential plane of said breaker-belt parallel to said support plane;

moving said beads vertically equally and oppositely toward each other while expanding said carcass circumferentially into adherent contact with said breaker-belt;

thereafter applying about said breaker-belt and carcass a circumferentially endless tread and curing the tire.

2. The method of making a tire as claimed in claim 1, wherein said breaker-belt is assembled, transported, and disposed about said carcass while in a rigid cylindrical ring.

3. The method of making a tire as claimed in claim 2, and while moving said beads toward each other, deploying a tire-shaping a curing core in said carcass, and while so deploying said core urging a bead molding ring against the axially exterior surface of each respectively associated bead.

4. The method as claimed in claim 2, and before applying said tread to said carcass, rotating the axis of said carcass from vertical to horizontal orientation and transporting said carcass to tire rotation means situated apart from the site whereat the carcass and breaker-belt are united for consolidating said breaker-belt and said carcass.

5. The method as claimed in claim 2, and after rotating said carcass and its axis from horizontal to vertical and before disposing said breaker-belt about said carcass, supporting said carcass against axial and radial deformation by fluid pressure exerted radially and axially symmetrically upward on the then upper bead and the portion of the carcass immediately adjacent said upper bead.

6. The method of making a tire of the class described comprising:
   building in cylindrical form about a horizontal axis a carcass including at least one tire carcass reinforcing ply and axially spaced apart tire beads enfolded in the respective ends of such ply;
   building apart from said carcass a circumferentially endless tire breaker-belt;
   rotating said carcass and its axis from horizontal to vertical orientation;
   suspending said carcass in vertical orientation and while so suspending the carcass moving a pair of curing core rigid ends upwardly coaxially of the carcass to position said ends respectively above and below the beads of said carcass, and then applying said breaker belt to said carcass.

7. Apparatus for making a tire of the class described comprising:
   core inserting means having a vertical central axis extending perpendicularly above and below an operating floor including:
   a rigid elevator mounted for straight line movement vertically up and down along said axis;
   a pair of hydraulic elevating cylinders for moving said elevator;
   a platen;
   a pair of shaping cylinders fixed on said elevator, each cylinder having a ram therein extendable and retractable parallel to said axis, said rams being fixed to said platen;
   a shaping and curing core having an upper and a lower core end and a vertical central shaft, said upper core end being removably affixed to said shaft for movement therewith along said axis, said lower core end being removably affixed to said platen;
   at least one pinion mounted rotatably about a pinion axis fixed on said elevator, said pinion axis lying in a plane normal to said vertical axis;
   at least one rack mounted on and extending parallel to said shaft in meshing engagement with said pinion;
   and at least one other rack fixed on and extending downwardly of said platen parallel to said vertical axis and in meshing engagement with said pinion, whereby said upper and said lower core end are respectively movable equally and oppositely toward and away from each other coaxially of said vertical axis in response to extension and retraction of the rams in said shaping cylinders.

8. The apparatus as claimed in claim 7, further comprising carcass lifting means having swingable boom, a vertical lifting axis and including a plurality of vertically extending arms and carcass engaging members mounted on said boom for movement uniformly toward and away from the lifting axis for grasping and for releasing a tire carcass;
   a support column;
   traversing means for swinging said lifting means arcuately about said column for traversing said lifting means horizontally between a carcass pickup position and a carcass suspending position whereat said lifting axis and said vertical axis are collinear;
   primary lifting drive means for raising said boom;
   and inching means for adjusting the vertical position of said carcass engaging members and a carcass grasped thereby relative said boom.

9. The apparatus as claimed in claim 7, including at least three vertical support stands disposed on said operating floor radially of and spaced angularly about said vertical axis each having a support surface for supporting a breaker belt relative to a carcass, each of said stands being vertically adjustable independently of the others of said stands.

10. The apparatus as claimed in claim 9, including height gauge means carried respectively by each of said stands and cooperable to align the respective support surfaces of said stands in a common plane parallel to the mid-circumferential plane of a carcass supported by said carcass shaping means.

11. The apparatus as claimed in claim 10, including breaker-belt assembly, transport, and support means comprising in combination a rigid cylindrical ring, a plurality of support engaging elements fixed on said ring and each engageable with a respectively associated one of said support stands to position said ring in coplanar relation with the actual mid-circumferential plane of a carcass supported on said carcass shaping means independently of the respective positions of said upper and said lower core ends.

12. Apparatus as claimed in claim 7, said tire shaping and curing core having a pair of bead mold rings disposed coaxially thereon for molding in a tire mold the axially outward surface of the respective tire bead, one of said bead mold rings being removably fixed on the respectively associated shaping and curing core end.

13. Apparatus as claimed in claim 12, including a tubular elastomeric, expansible carcass shaping and tire curing sleeve having its respective axial ends each secured fluid tightly to the respectively associated core rigid end.

14. Apparatus as claimed in claim 12, each said core end having a coaxial bore open therethrough, and locking means cooperable for locking each said end coaxially fluid tightly to the other said end.

15. Apparatus as claimed in claim 7, including a pit extending downwardly from said operating floor, vertical walls defining said pit and supporting a plurality of vertical rails, a plurality of flanged wheels mounted on said elevator and rollably engaging the respective rails, said elevating cylinders being operable to lower said core completely below said operating floor and to raise same to a working height above said floor.

16. Tire building apparatus for rotating an uncured tire carcass about an axis, comprising:
   a tire rotating stand having a headstock and a driving tailstock spindle having a drivable center cone mounted in the headstock and a tailstock spindle having a freely rotatable center cone mounted in the tailstock the center cones being coaxial with each other on a horizontal axis at a first elevation;
   an arbor having internal cones in each of its ends respectively conjugate with the drivable center cone and the freely rotatable cone;
   a wheeled truck having a pair of half-bearing saddles for rotatably supporting said arbor about a horizontal rotatable axis at a second elevation spaced less than one inch below the first elevation;
   a tire shaping and curing core corotatably mounted on said arbor;
   an air cylinder coaxially and corotatably mounted on said driving spindle;
   a piston rod disposed in said cylinder and connected to said drivable center cone for moving same axially of the driving spindle;

motor means drivably connected to the driving spindle to rotate the same, a screw coaxial in the tailstock spindle and drivingly connected to said freely rotatable center zone to move same coaxially of the tailstock spindle;

the cylinder and piston being operable to urge said center cones to enter into the internal cones of the arbor to raise the axis of the same from the second to the first elevation;

and a motor connected to the screw operable to move the arbor toward and away from the headstock while the arbor is supported only by the center cones.

17. The method of making a tire of the class described comprising:

building in cylindrical form about a horizontal axis a carcass including at least one tire carcass reinforcing ply and axially spaced apart tire beads enfolded in the respective ends of such ply;

building, apart from said carcass, a circumferentially endless tire breaker-belt;

upending said carcass and its axis from horizontal to vertical position;

disposing said breaker-belt about said carcass in said vertical position about a common vertical axis and in radially spaced, non-contacting relation with the carcass while positioning the mid-circumferential line of said carcass and the midcircumferential plane of said breaker-belt in coplanar relation independently of means supporting the carcass;

and while supporting said carcass in said vertical position by lifting means and before disposing said breaker-belt about said carcass, engaging with each other the interior surface of said carcass and elastically expandable means and then disengaging said lifting means to support said carcass only by said elastically expandable means engaging the interior surface thereof in a circumferential zone axially inward of the beads and extending axially across the circumferential plane of the carcass;

moving said beads vertically equally and oppositely toward each other while expanding said carcass circumferentially into adherent contact with said breaker-belt;

continuing to move said beads toward each other to a dimension measured parallel to said axis equal to the axial dimension between said beads at which said tire is to be cured;

and holding said beads positively fixed at said dimension and thereafter applying about said breaker-belt and carcass a circumferentially endless tread and curing the tire.

18. The method of making a tire of the class described comprising:

building in cylindrical form about a horizontal axis a carcass including at least one tire carcass reinforcing ply and axially spaced apart tire beads enfolded in the respective ends of such ply;

building, apart from said carcass, a circumferentially endless tire breaker-belt;

upending said carcass and its axis from horizontal to vertical position;

disposing said breaker-belt about said carcass in said vertical position about a common vertical axis and in radially spaced, non-contacting relation with the carcass while positioning the mid-circumferential line of said carcass and the midcircumferential plane of said breaker-belt in coplanar relation independently of means supporting the carcass;

moving said beads vertically equally and oppositely toward each other, deploying a tire shaping and curing core in said carcass while expanding said carcass circumferentially into adherent contact with said breaker belt before and while engaging upper and lower bead mold rings against the axially exterior surface of the respectively associated beads;

moving said beads vertically equally and oppositely toward each other while expanding said carcass circumferentially into adherent contact with said breaker-belt;

continuing to move said beads toward each other to a dimension measured parallel to said axis equal to the axial dimension between said beads at which said tire is to be cured;

and holding said beads positively fixed at said dimension and thereafter applying about said breaker-belt and carcass a circumferentially endless tread and curing the tire.

* * * * *